Aug. 22, 1950      D. H. ANNIN      2,519,333
FLUID FLOW CONTROL DEVICE
Filed Feb. 25, 1946      2 Sheets-Sheet 2
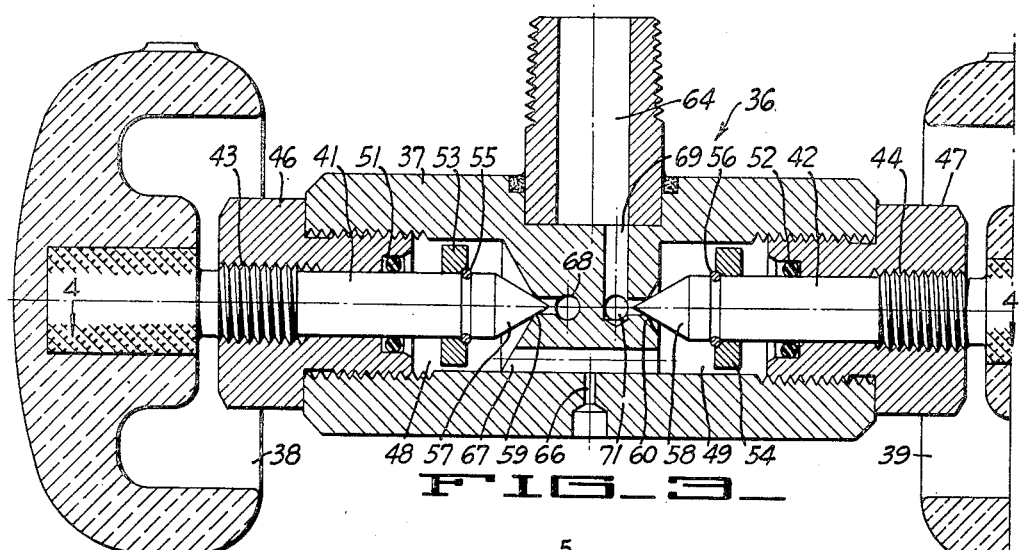
FIG_3_
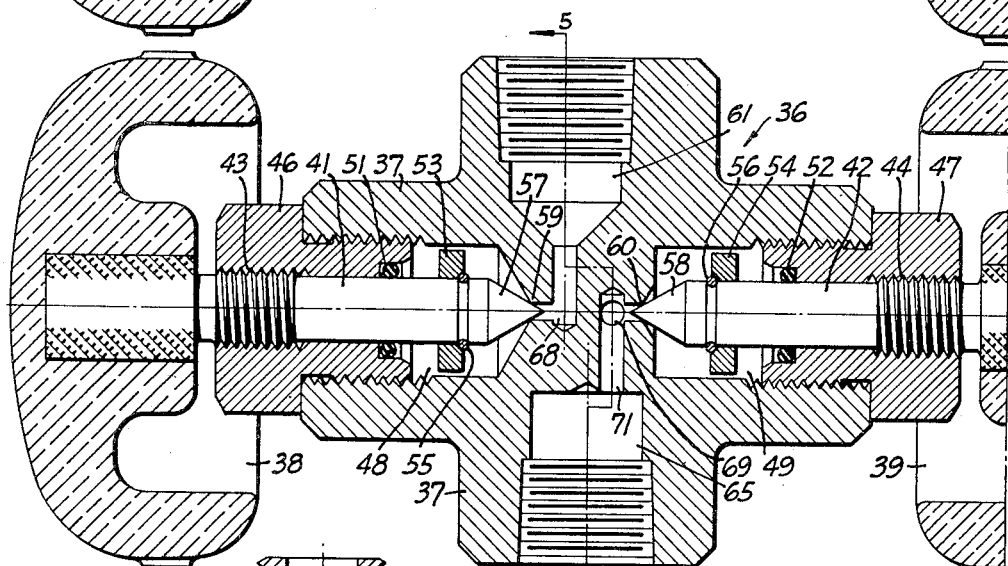
FIG_4_
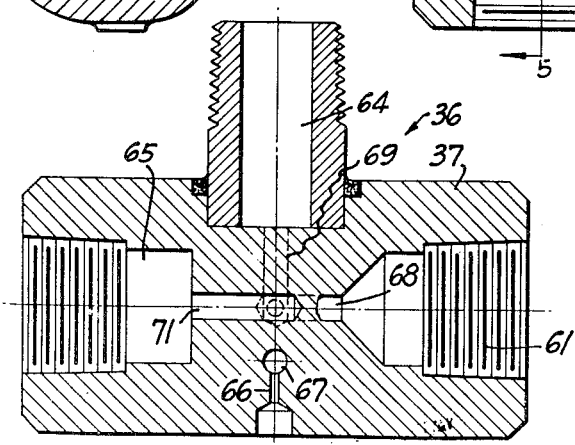
FIG_5_
INVENTOR.
Douglas H. Annin
BY
Paul D. Flehr
ATTORNEY Patented Aug. 22, 1950

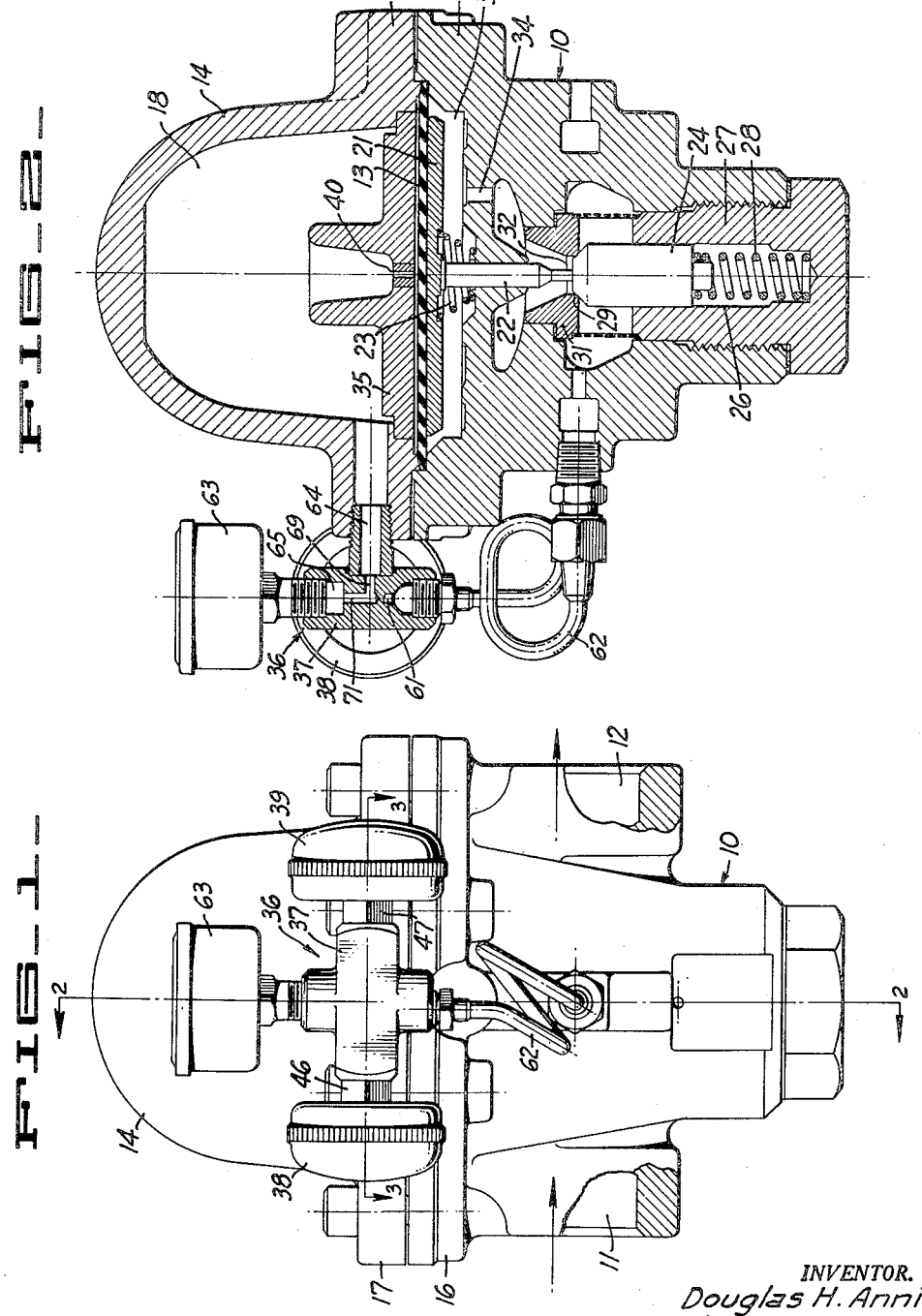

2,519,333

UNITED STATES PATENT OFFICE 2,519,333

FLUID FLOW CONTROL DEVICE

Douglas H. Annin, Oakland, Calif., assignor to Fluid Control Engineering Co., a copartnership consisting of Marvin H. Grove and Julia E. Grove, both of Piedmont, Calif.

Application February 25, 1946, Serial No. 649,840

2 Claims. (Cl. 50—21)

This invention relates generally to fluid flow control devices, such as pressure reducing regulators, back pressure regulators, pressure relief valves, and the like.

Devices of the above type commonly employ a flexible diaphragm loaded by means of a compression spring or by gas under pressure, and arranged to operate a valve. For example in Grove Patent No. 2,047,101 there is shown a pressure reducing regulator in which a closed dome chamber is provided on one side of the diaphragm to receive gas under pressure to load the diaphragm. Devices of this type are particularly applicable to relatively high pressure operation, as for example where the fluid pressures being regulated or controlled may be of the order of 1000 to 6000 p. s. i. or more. As disclosed in said Patent No. 2,047,101, in the past the loading pressure has been adjusted by means of hand operated needle valves incorporated directly in the mounting means for the diaphragm, as for example in the flanges of the dome and body parts of the device. Such construction has been relatively expensive and in addition it has not afforded the ease of operation desired.

It is an object of the present invention to provide a fluid flow control device of the type having a diaphragm loaded with gas under pressure and provided with improved means to enable quick and easy adjustment of the loading pressure.

Another object of the invention is to provide a device of the above character which can be more readily manufactured than constructions used in the past.

Additional objects of the invention will appear from the following description in which the preferred embodiment has been set forth in detail in conjunction with the accompanying drawing.

Referring to the drawing:

Figure 1 is a side elevational view of a device incorporating the present invention, which in this instance is a pressure reducing regulator.

Figure 2 is a cross sectional view taken along the line 2—2 of Figure 1.

Figure 3 is an enlarged cross sectional detail illustrating the construction of the loading valve.

Figure 4 is a cross sectional view taken along the line 4—4 of Figure 3.

Figure 5 is a cross sectional view taken along the line 5—5 of Figure 4.

In the drawing the invention has been shown incorporated in a fluid flow control device of the pressure reducing type. It is to be understood however that the invention may be incorporated in a variety of fluid flow control devices, as for example back pressure regulators, pressure relief valves, and like devices having a diaphragm loaded by gas under pressure. The pressure reducing regulator illustrated utilizes features disclosed and claimed in Grove 2,047,101. Briefly it consists of a body 10 having inflow and outflow passages 11 and 12 adapted to be connected with associated piping. A flexible diaphragm 13 is mounted between the body 10 and the dome part 14. The peripheral edge portion of the diaphragm is clamped between the body and dome flanges 16 and 17 in such a manner as to form a fluid tight seal. The diaphragm can be made of various materials capable of flexing action, such as natural or synthetic rubber. The chamber 18 formed by the dome 14 is adapted to receive air or like gas under pressure to provide a desired loading upon the diaphragm. A diaphragm plate 21 engages one side of the diaphragm, and in turn abuts one end of a thrust rod or stem 22, which is slidably mounted within the body. A light compression spring 23 retains the diaphragm plate 21 in proper position. The lower end of the push rod 22 engages a movable valve member 24, which can be in the form of a cylinder as illustrated slidably fitted within a bore 26, formed in the closure plug 27. The valve member contacts the stationary seat 29 formed on seat ring 31. The orifice 32 through the seat ring connects between the inlet and outlet passages, with the flow in the instance illustrated being upwardly. The outlet passage is also shown connected with the space 33 below the diaphragm through the duct 34, whereby one side of the diaphragm is subjected to outlet pressure and the other side subjected to the loading force of gas under pressure in dome chamber 18.

In order to cause smooth regulating action under all operating conditions a dome plate 35 is provided adjacent the upper side of the diaphragm, and the relatively small space between this plate and the diaphragm is connected to the main space of the chamber 18, through the flow restricting orifice 40.

In operating a pressure reducing regulator of the type described, the pressure maintained upon the outlet side can be adjusted by changing the gas pressure in dome chamber 18. Such adjustments are generally accomplished by permitting a small amount of the higher pressure air from the inlet side of the regulator to be bled into the dome chamber, to thereby increase the pressure within the same, or if it is desired to lower the pressure, then a certain amount of air is permitted to vent to the atmosphere. In the present instance a special loading unit 36 is provided to effect such adjustments. This loading unit is illustrated in detail in Figures 3 to 5 and includes a body 37 having connections as will be presently explained to the inlet or upstream side of the regulator, to the dome chamber, and also to the atmosphere through a bleed orifice. Two manually operated valves are provided which are preferably of the needle type, and operated by the hand wheels or knobs 38, 39. The particular needle valves illustrated make use of stems 41, 42 which have threaded portions 43, 44, engaging the gland fittings 46, 47. Fittings 46, 47 are threaded within the two aligned bores 48, 49, formed axially within the two sides of the body. Suitable sealing means is provided between fittings 46, 47 and the stems 41, 42, such as the resilient O rings 51, 52. Excessive opening movement of the stems 41, 42 is prevented by suitable means such as the stop washers 53, 54 which engage the snap rings 55, 56. The tapered end portions 57, 58 of stems 41, 42 engage the stationary seats 59, 60, formed within the body.

A passage 61 in the body is adapted to connect to a source of gas pressure, as for example to the inlet side of the regulator by means of the connecting pipe 62. Another passage 65 is provided for connection to a pressure gauge 63. A third passage 64 connects directly to the dome chamber 18. The bleed to the atmosphere previously mentioned is in the form of a small flow restricting orifice 66.

Within the body there is a duct 67 which connects the two bores 48, 49. A duct 68 connects from the passage 61 to the orifice of the valve seat 59. Ducts 69 and 71 connect together and communicate between the dome chamber 18 and the pressure gauge 63 (Figure 2). Duct 69 also connects with the orifice through seat 60 (Figure 3).

Operation of the regulating device and particularly the loading arrangement described above, can be explained as follows: Ordinarily a quantity of trapped air at a desired pressure is maintained in dome chamber 18, whereby a given pressure is maintained upon the outlet side of the regulator. Assuming that one desires to introduce additional gas into the dome chamber 18 to increase the loading force and the outlet pressure, then both knobs 38, 39 are turned to open their associated needle valves. High pressure gas flows through seat 59 from passage 61 (Figure 4) and through duct 67 (Figure 3) with part of the air from this region being continuously vented to the atmosphere through orifice 66. Assuming maintenance of pressure in duct 67 in excess of the dome chamber pressure, flow of air occurs through seat 60 and duct 69 to the dome chamber to increase the pressure of the same to a desired value as indicated by the gauge 63. Thereafter both of the needle valves are closed to seal off the dome chamber and to shut off air from the high pressure side.

During the operation just described the rate with which air is being supplied to the dome can be adjusted by varying or adjusting the throttling effect of the needle valves. In this connection the action of bleed orifice 66 facilitates operation of the device in that without the action of this orifice it would be necessary to use relatively small needle valves, which would necessarily be quite critical in their adjustment for relatively high pressures. With a bleed vent there is a substantial reduction in the pressure supplied to the second valve, and therefore such reduced pressure can be more readily controlled by the second valve.

When it is desired to reduce the pressure of the dome chamber the one needle valve operated by knob 38 remains closed, and the other needle valve is opened by turning knob 39. This permits air from the dome chamber to vent back through duct 69, the valve orifice of seat 60, duct 67 and the bleed orifice 66 (Figure 3). Here again the flow restriction of orifice 66 facilitates adjustment of the needle valve and renders the same less critical. After the pressure has been thus reduced to its desired value as indicated by gauge 63, the needle valve is again closed to seal off the dome chamber.

It will be evident that the loading arrangement described above is relatively simple to operate and can be used with relatively high inlet pressures, as for example pressures of the order of 1000 to 6000 p. s. i. or more. The construction of the loading arrangement is relatively simple, and it avoids relatively expensive machining operations such as are involved when it is attempted to mount needle valves directly in the body and dome flanges, as disclosed for example in said Patent 2,047,101.

I claim:

1. In a fluid flow control device, a flexible fluid operated diaphragm, means serving as a mounting for the diaphragm and forming a closed chamber on one side of the same, valve means operated by flexing of the diaphragm, and means for supplying a desired gas loading pressure to said chamber, said means comprising a pair of hand operated valves connected serially between a source of gas under pressure and said chamber, whereby when both said valves are open gas is applied from said source to said chamber, and a restricted venting orifice of constant cross-sectional flow area discharging to the atmosphere and connected between said valves whereby gas is vented to the atmosphere when both said valves are open, said orifice likewise serving to vent gas from said chamber upon opening one of said valves while the other valve remains closed, the closed valve serving to shut off gas from said source.

2. In a fluid flow control device, a flexible fluid operated diaphragm, dome and body parts forming a mounting for the diaphragm, the dome part forming a closed dome chamber on one side of the diaphragm, valve means within the body operated by flexing of the diaphragm, and loading means for adjusting the gas pressure within said dome chamber, said loading means comprising a body separate from the dome part, a pair of needle valves carried by the body, passages in the body for making connection to the dome chamber and to a source of gas under pressure, a flow restricting orifice of constant cross-sectional flow area formed in the body and serving to form a bleed to the atmosphere, and ducts within the body serving to connect the needle valves serially between the source of gas under pressure and the dome, and also serving to connect said orifice to a duct serially connecting the needle valve.

DOUGLAS H. ANNIN.

REFERENCES CITED

The following references are of record in the file of this patent:

UNITED STATES PATENTS

| Number | Name | Date |
|---|---|---|
| 2,163,597 | Grove | June 27, 1939 |
| 2,164,095 | Thomes | June 27, 1939 |
| 2,356,970 | Brockett | Aug. 29, 1944 |